Patented July 21, 1936

2,048,658

UNITED STATES PATENT OFFICE 2,048,658

CARBONACEOUS FERTILIZER

Josef Jannek, Ludwigshafen-on-the-Rhine, and Hugo Weitzel, Mannheim, Germany, assignors to I. G. Farbenindustrie Aktiengesellschaft, Frankfort-on-the-Main, Germany No Drawing. Application July 13, 1933, Serial No. 680,330. In Germany July 16, 1932

8 Claims. (Cl. 71—7)

The present invention relates to a carbonaceous fertilizer and a process of producing same.

We have found that the products obtainable by the treatment of carbonaceous material with chlorine constitute after neutralization with basic substances, in particular with ammonia or ammonium salts, excellent fertilizers.

Carbonaceous material which may be used for the purpose of our invention comprises fossil material, such as mineral coal, brown coal, humus coal, peat and coking products thereof, for example coke, brown coal low temperature coke, and the solid residues derived from the extraction or destructive hydrogenation of such materials, as well as recent carbonaceous material, such as wood, for example saw dust, lignin and cellulose.

The treatment of the carbonaceous initial materials with chlorine is advantageously effected by leading gaseous chlorine thereover at ordinary temperature. In order to avoid excessive heating, the chlorine gas may be diluted with other gases, as for example air, nitrogen or carbon dioxide. Furthermore, hypochlorites, such as chlorite of lime, may in some cases be employed instead of gaseous chlorine or in addition thereto. In many cases, as for example when employing substances which are already carbonized, the treatment with chlorine may also be carried out at elevated temperatures up to about red heat. It is preferable to work in the presence of moisture. For this purpose it is recommended that the carbonaceous material be previously moistened or, for example, that the gas containing chlorine be laden with water vapor. The treatment of the carbonaceous substances with chlorine may also be carried out in aqueous suspension. Liquid chlorine may also be employed and the treatment may be carried out under pressure.

For the chlorination it is preferable to arrange several containers of acid-proof material which are charged with the carbonaceous material one behind another so that the current of chlorine passes through each container in turn. When the reaction in the first container is completed, it is removed from the cycle and the chlorine led direct into the next container while the first container is emptied and charged afresh. When the reaction which proceeds with evolution of heat, is completed, the excess of chlorine and if desired the major portion of the absorbed hydrogen chloride are expelled by a current of air, if desired while heating. As far as possible only hydrogen chloride free from chlorine should leave the last container. In case the chlorination is carried out in aqueous suspension, the liquid is drained off.

The solid chlorination product is neutralized with a basic substance which of course should not be obnoxious to the plants. It is especially recommended that ammonia or ammonium salts be used for the neutralization. This may be effected for example by leading ammonia gas over the material, if desired under pressure, by moistening with aqueous ammonia, by the action of liquid ammonia, by mixing with ammonium carbonate or bicarbonate or by wetting with a solution of these salts. Potassium carbonate, sodium carbonate, lime or calcium carbonate or mixtures of these substances may also be used for the neutralization. Ammonium bicarbonate is particularly suitable for the neutralization since it may be employed even in excess without imparting to the product a distinct alkaline reaction which would be obnoxious to the plants. The material may, before, during or after the neutralization be mixed with other fertilizer salts or acid components of fertilizer salts, such as phosphoric acid or nitric acid, in such proportions that a suitable complete fertilizer is obtained as the final product. The neutralization with solid basic substances and the admixture of further fertilizing salts is best carried out in an edge mill.

The products have in a high degree the fertilizing action known to be possessed by humic acid and humates. By reason of the formation of acid groups effected during the treatment with chlorine, the carbonaceous substances containing chlorine are capable of absorbing large amounts of basic substances. When employing ammonia, or ammonium bicarbonate, as the neutralizing agent, therefore, products may be obtained having a high content, as for example up to 20 per cent, of readily assimilable nitrogen.

When employing non-carbonized carbonaceous materials, as for example brown coal, products are obtained which are mainly water-soluble and this is especially advantageous for their employment as fertilizers.

The process as described can advantageously be combined with the decomposition of crude phosphate, or phosphate rock, by working up a mixture of carbonaceous material and crude phosphate in the manner described. By the action of chlorine upon the carbonaceous material hydrochloric acid is formed by which the crude phosphate is decomposed. By employing the carbonaceous material and the crude phosphate in suitable proportion practically the total amount of phosphates present are converted into soluble form. Before the decomposition of the mixture of carbonaceous material and the phosphates, a water-soluble sulphate, advantageously an alkali metal or ammonium sulphate, may be incorporated therewith, a conversion of the calcium chloride into calcium sulphate thus being effected.

On neutralization of the decomposition product from which the excess of chlorine and, if desired, the major portion of the absorbed hydrogen chloride has been expelled by a current of air, and by the addition of potassium salts a complete fertilizer is obtained containing all the chief nutrients in a readily assimilable form and in addition thereto a considerable proportion of valuable carbonaceous material exerting a favorable action on the growth of the plants. The complete fertilizers thus obtained have good properties as regards spreading and storing. By the admixture of these fertilizers to fertilizing salts liable to cake the hygroscopicity of the latter can be reduced substantially. The new fertilizers may be readily pressed into tablets, and this is of advantage in many cases for the purpose of convenient dosing.

The decomposition of the carbonaceous material and the crude phosphate by means of chlorine may be improved by the addition of sulphur dioxide. Water should be present in amounts that sulphur dioxide and chlorine can react according to the equation:

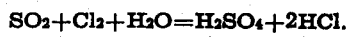
$$SO_2 + Cl_2 + H_2O = H_2SO_4 + 2HCl.$$

Since in the reaction of chlorine on carbonaceous material chlorine is absorbed by the latter and hydrochloric acid is formed simultaneously, chlorine should be employed in excess. By this method not only the hydrochloric acid formed during the process but also the sulfuric acid formed according to the above mentioned formula is made available for the decomposition of the crude phosphate. Several advantages arise from the employment of chlorine and sulphur dioxide. Since a definite amount of carbonaceous material by reaction with chlorine yields only a definite amount of hydrochloric acid, the amount of crude phosphate which can simultaneously be decomposed is dependent on the amount of carbonaceous material employed and consequently the amount of nutrients in the final product is restricted. Contrary thereto when using sulphur dioxide in addition to chlorine further amounts of an acid decomposing the crude phosphate are formed so that the portion of carbonaceous material can considerably be diminished. Consequently, fertilizers having a higher content of nutritive constituents can be produced. At the same time the total amount of applied gases is reduced. A further advantage resides in the formation of gypsum which improves the storage properties of the fertilizer.

The following examples will further illustrate the nature of this invention but the invention is not restricted to these examples. The parts are by weight.

*Example 1*

Pit moist brown coal is treated with chlorine which combines with the coal, while heat is evolved and hydrochloric acid is formed in about twice the amount of chlorine bound by the coal, the hydrochloric acid being retained for the most part by the wet coal. After the excess of chlorine and some hydrochloric acid has been removed by blowing air through the reaction mass, the latter is neutralized by ammonia or ammonium bicarbonate and dried. A fertilizer is thus obtained containing 11.6 per cent of ammonia-nitrogen, of which 5.9 per cent are present in the form of ammonium chloride and 5.7 per cent are bound to carbon; 30 per cent of chlorine, 29 per cent of carbon and 3.6 per cent of water. 65 per cent of the carbon are soluble. The same brown coal, when neutralized with ammonia before acting thereon with chlorine, has a content of ammonia-nitrogen which is only 0.75 per cent and only 4 per cent thereof are soluble.

*Example 2*

A mixture of 2100 parts of pit-moist humus coal and 700 parts of ground pebble phosphate is treated with gaseous chlorine until the whole amount of phosphate has been decomposed. After the decomposition, air is blown through for a short time, and the mass mixed in an edge mill with 1200 parts of ammonium bicarbonate and 450 parts of potassium chloride. A fertilizer containing carbon is obtained which also contains nitrogen, phosphoric acid and potash in a form readily assimilable by plants.

Instead of humus coal, the same amount of brown coal may be employed.

*Example 3*

1000 parts of pit-moist humus coal are mixed with 350 parts of ground crude phosphate and 280 parts of potassium sulphate, gaseous chlorine being led through the mixture until the phosphoric acid contained in the initial material in the form of phosphates is practically completely converted into water-soluble form. Air is blown into the decomposed product for a short time and then gaseous ammonia until the mass which originally had an acid reaction acquires an alkaline reaction. A dry product is directly obtained which contains, in addition to a considerable amount of readily soluble carbon, also nitrogen, phosphoric acid and potash in a form readily assimilable by plants.

*Example 4*

An intimate mixture of 1000 parts of ground crude phosphate and 1000 parts of pit-moist brown coal are treated with a gas mixture containing 75 per cent of chlorine and 25 per cent of sulphur dioxide. For the conversion about 800 parts of the gas mixture are employed. After blowing air through the reaction mixture 1270 parts of ammonium bicarbonate and 635 parts of potassium chloride containing 57 per cent $K_2O$ are mixed to the mass. A complete fertilizer containing carbon is thus obtained containing 5.4 per cent ammonia-nitrogen, 9.0 per cent ammonium citrate soluble phosphoric acid and 9.9 per cent of potassium in a water-soluble form.

What we claim is:—

1. A process of producing a fertilizer containing carbon which comprises causing chlorine and sulphur dioxide to react on a moist mixture of carbonaceous material and a crude phosphate and incorporating a basic substance with the solid reaction mass to neutralize it.

2. A process of producing a fertilizer containing carbon which comprises causing chlorine and sulphur dioxide to react on a moist mixture of carbonaceous material and a crude phosphate and incorporating ammonia or a salt thereof with the solid reaction mass to neutralize it.

3. A process of producing a fertilizer containing carbon which comprises causing chlorine and sulphur dioxide to react on a moist mixture of carbonaceous material and a crude phosphate and incorporating ammonium bicarbonate with the solid reaction mass to neutralize it.

4. A process of producing a fertilizer containing carbon which comprises causing chlorine and sulphur dioxide to react on a moist mixture of solid carbonaceous material of vegetable origin and a crude phosphate and incorporating a basic substance with the solid reaction mass to neutralize it, a potassium salt being incorporated in any stage of the process.

5. A process of producing a fertilizer containing carbon which comprises causing chlorine and sulphur dioxide to react on a moist mixture of solid carbonaceous material of vegetable origin and a crude phosphate and incorporating ammonia or a salt thereof with the solid reaction mass to neutralize it, a potassium salt being incorporated in any stage of the process.

6. A process of producing a fertilizer containing carbon which comprises causing chlorine and sulphur dioxide to react on a moist mixture of solid carbonaceous material of vegetable origin and a crude phosphate and incorporating ammonium bicarbonate with the solid reaction mass to neutralize it, a potassium salt being incorporated in any stage of the process.

7. The fertilizer containing carbon, chlorine, nitrogen, phosphorus and sulphur in combined form resulting from the process of claim 2.

8. The fertilizer containing carbon, chlorine, nitrogen, phosphorus, sulphur and potassium in combined form resulting from the process of claim 5.

JOSEF JANNEK.
HUGO WEITZEL.